E. G. HOFFMANN.
TRUCK FOR RAILWAY CARS.
APPLICATION FILED MAR. 27, 1907.
905,532.
Patented Dec. 1, 1908.
2 SHEETS—SHEET 1.
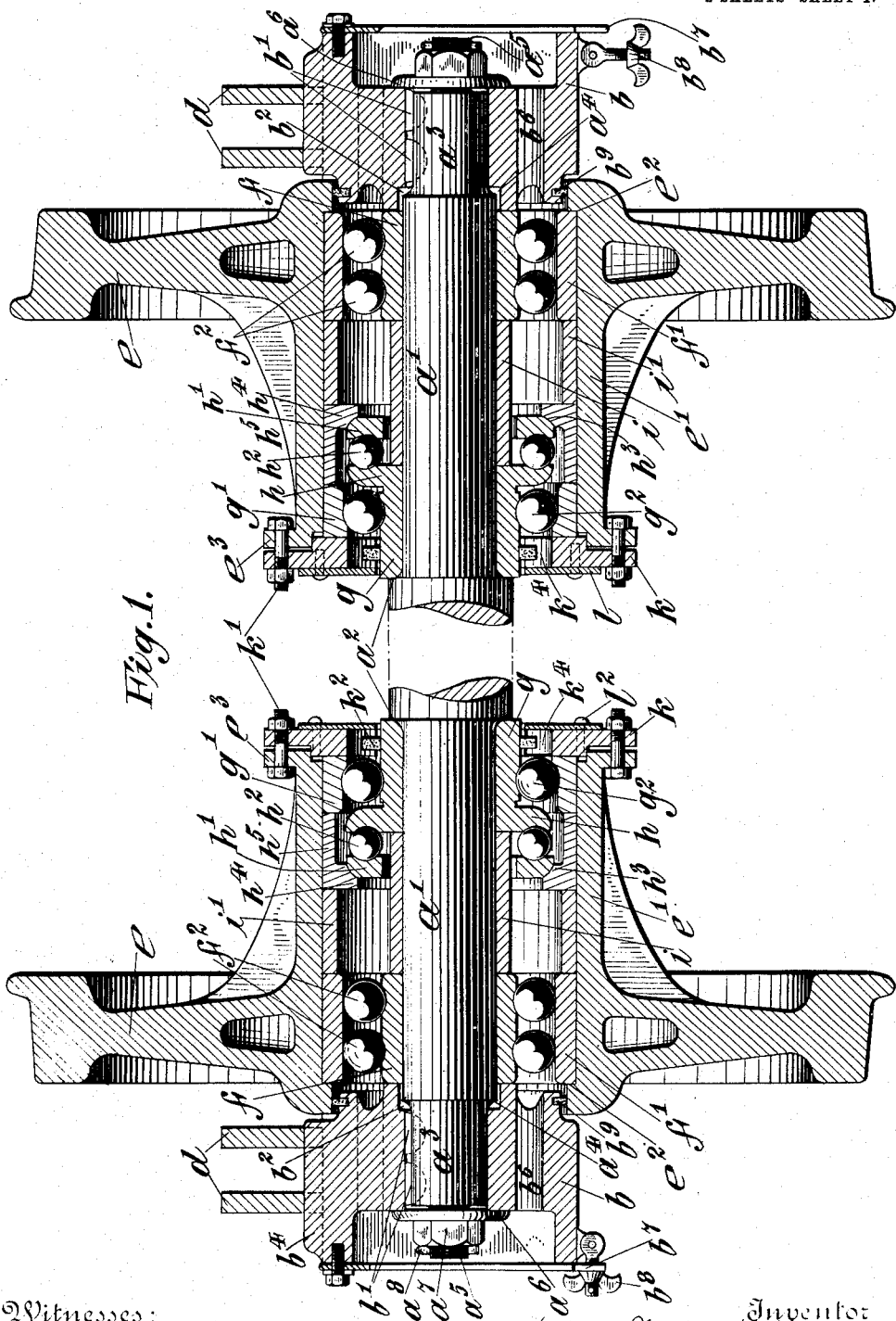

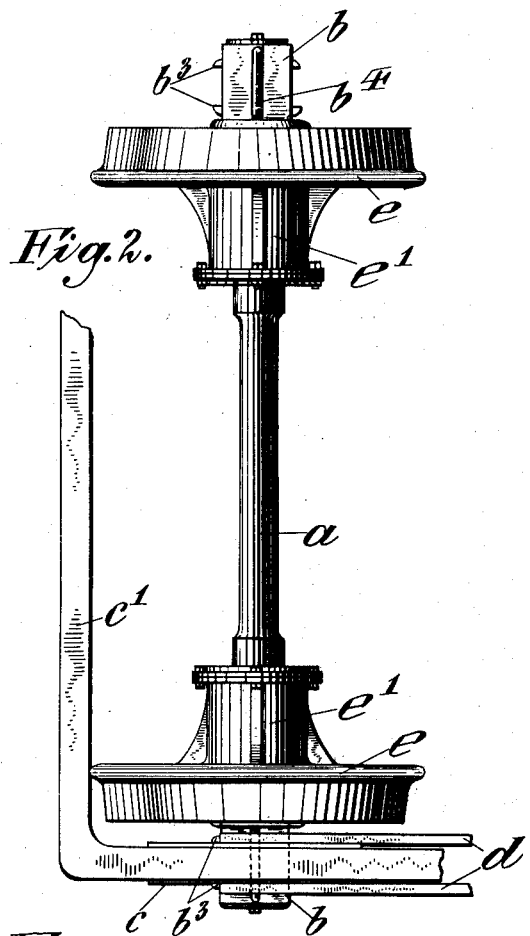
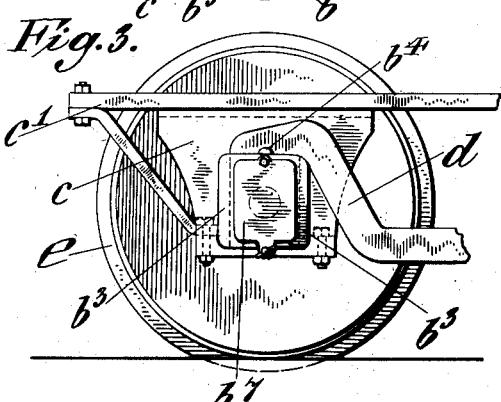
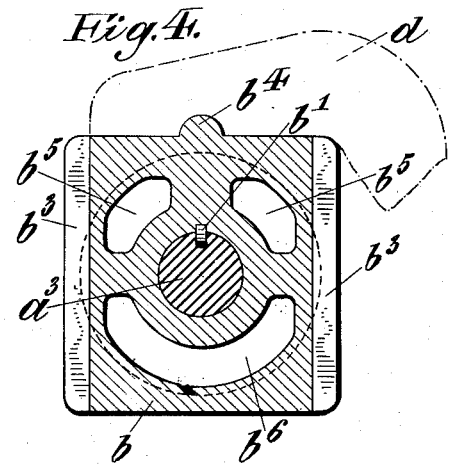
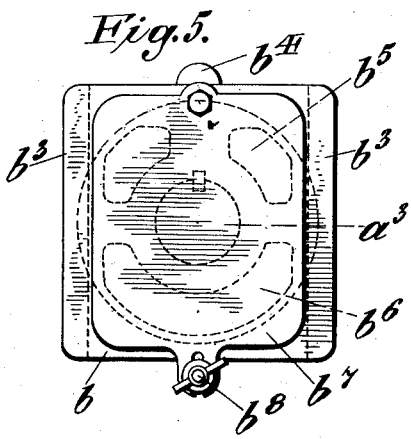
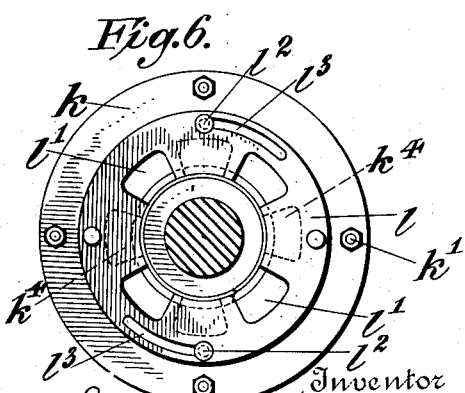

UNITED STATES PATENT OFFICE.

ERNST GUSTAV HOFFMANN, OF NEW ROCHELLE, NEW YORK.

TRUCK FOR RAILWAY-CARS.

No. 905,532.  Specification of Letters Patent.  Patented Dec. 1, 1908.

Application filed March 27, 1907. Serial No. 364,923.

*To all whom it may concern:*

Be it known that I, ERNST GUSTAV HOFFMANN, a citizen of the United States, residing in the city of New Rochelle, in the county of Westchester, in the State of New York, have invented certain new and useful Improvements in Trucks for Railway-Cars, of which the following is a specification, reference being had to the accompanying drawings, forming a part hereof.

It has long been recognized that the present practice, in railway truck construction, of mounting the wheels rigidly upon a rotating axle, is a source of danger and of waste of power. Various constructions have been devised heretofore for the purpose of permitting opposite wheels on the same axle to rotate independently, so that each wheel may rotate at a speed determined by its own diameter and the curvature of the track without regard to the speed of rotation of the opposite wheel and thereby a prolific cause of accident and waste of power be removed. Such constructions, however, have not been generally adopted, in some cases because of the necessary reconstruction of the truck frame to accommodate them, and in some cases because they have not proved satisfactory under practical test, largely by reason of unscientific design of the bearings employed.

It is the object of this invention to overcome the objections to the introduction of independently rotating wheels and to produce such a construction as shall permit of the application of modern ball bearings and make it possible to secure the advantages incident to their use in railway truck construction.

The improved construction is so designed as to permit of the substitution of the independently rotating wheels with their axle for the present arrangement of rotating axle with the wheels rigidly secured thereto, without any alteration whatever in the truck frame and brake mechanism or their appurtenances and without involving more labor than is now expended in replacing one rotating axle and its wheels by another rotating axle and its wheels.

Various other advantages which are incident to the attainment of the main object of the invention will be pointed out hereinafter in connection with the detailed explanation of the nature of the invention which follows and in which reference is had to the accompanying drawings in which, for purposes of illustration and explanation of the nature of the invention, there is shown a convenient and practical embodiment of the invention.

In the drawings—Figure 1 is a view in longitudinal central section of a portion of a car truck to which the invention is applied, the axle being shown in elevation. Fig. 2 is a partial plan view of a truck to which the invention is applied, a single axle with its wheels being shown, the scale being smaller than that of Fig. 1. Fig. 3 is a side elevation of the parts shown in Fig. 2. Fig. 4 is a detail view in transverse section through one of the guide blocks and axle on the same scale as Fig. 1. Fig. 5 is a detail view in end elevation of one of the guide blocks with the cover plate. Fig. 6 is a detail view in elevation of the inner end of the bearing with its cover plate, the axle being shown in section.

In the embodiment of the invention illustrated in the drawings the axle $a$, substantially of the usual size and weight, has near each end a reduced portion $a'$ preferably machined to receive with a driving fit parts of the bearing, as hereinafter described, and forming a shoulder $a^2$ against which such parts of the bearing may abut. At each end the axle is preferably still further reduced, as at $a^3$, to form a shoulder $a^4$ and to be secured in the corresponding guide block $b$, being preferably, although not necessarily, held from rotation therein by keys $b'$. The guide block is preferably recessed, as at $b^2$, to fit over the shoulder $a^4$ of the axle $a$ for the purpose of crowding the inner members of the ball bearing together and against the abutment or shoulder $a^2$. Each extremity of the axle is still further reduced and threaded, as at $a^5$, to receive a washer $a^6$ and nut $a^7$ by means of which the axle is secured in the guide block $b$ and the latter is crowded against the inner members of the ball bearing. A split pin $a^8$ may be inserted in the projecting portion of the axle to prevent the working loose of the nut. It will be observed that threading is required at no other point for the purpose of holding in place the material parts of the improved structure and that even this threading is so located that no possible danger of weakening the axle can arise therefrom.

The guide blocks $b$ have substantially the same dimensions and shape externally as the journal boxes now commonly used with rotating axles to which the wheels are rigidly secured, and fit the usual guide ways formed in the guide or carrying plate $c$ of the truck frame, having guide ribs $b^3$ for coöperation therewith. The guide blocks are also provided each with a boss $b^4$ on its upper surface through which and the levers $d$ the load carried by the truck is distributed upon the guide blocks. In place of the usual brasses and chambers for lubricating wool etc. the blocks $b$ are provided with openings $b^5$ and $b^6$ through which the bearings can be inspected from time to time or lubricant can be introduced as may be required. Access of dust and dirt to the bearings through such openings is prevented by a swinging cover plate $b^7$, which may be pivoted at the top and provided at the bottom with a pivoted bolt and wing nut $b^8$ for securing the plate.

Each flanged wheel $e$ may be of any suitable construction, so far as the body of the wheel is concerned, but is provided with an extended hub $e'$, which is extended inwardly when, as in ordinary car trucks, the guide plate $c$ is located outside of the wheels, or is extended outwardly when, as in the case of a locomotive pilot truck, the guide plates are inside the wheels. This extended hub acts as a casing or container for members of the ball bearing, as hereinafter described. The chamber of the wheel and its hub, which is large enough to receive the ball bearings as hereinafter described, is closed at its outer end by the guide block $b$, the inner portion of which is preferably reduced in diameter sufficiently to permit it to enter within the chamber where it may carry a felt washer $b^9$ or other suitable packing to prevent access of dust and dirt to the bearing chamber between the block and the wheel.

The main part of the load and, in fact, when the track is straight, practically the entire load, is borne by a double ball bearing which is located approximately in the plane of the tread of the wheel, as clearly shown in Fig. 1, such ball bearing comprising an inner race way or cone $f$ driven upon the axle $a$, an outer race way or cup $f'$ forced within the bearing chamber of the wheel, and interposed balls $f^2$. For greater stability and to meet practical conditions of use, however, another journal bearing is provided near the end of the extended hub and, preferably in addition thereto, a separate thrust bearing, which may be single or double as required. As shown, the secondary journal bearing comprises an inner race way or cone $g$ forced upon the reduced portion $a'$ of the axle against the shoulder or abutment $a^2$, an outer race way or cup $g'$ forced within the end of the bearing chamber of the wheel, and interposed balls $g^2$. The sleeve which constitutes the inner race way or cone $g$ is also formed with a flange $h$ which forms one member of a thrust bearing, the other member $h'$ of which, coöperating with the interposed balls $h^2$, is supported with a spherical seat $h^3$, upon the flange $h^4$ of a sleeve $h^5$ also forced within the bearing chamber of the wheel. A spacing sleeve $i$ is slipped upon the reduced portion $a'$ of the axle between the sleeves $f$ and $g$ and a corresponding spacing sleeve $i'$ is slipped within the bearing chamber of the wheel between the sleeves $f'$ and $h^5$. The inwardly extended portion of the guide block $b$ impinges upon the sleeve $f$ and as the sleeve $g$ abuts against the shoulder $a^2$ of the axle $a$, the several inner members of the bearing are forced home and held securely in position by setting up the nut $a^7$ against the guide block. In like manner the outer bearing members are forced home against an internal shoulder $e^2$ in the bearing chamber of the wheel, against which the sleeve $f'$ abuts, and held securely in position by a closing device $k$ at the inner end of the wheel hub, such closing device being reduced in diameter to enter within the bearing chamber and impinge upon the sleeve $g'$ and being conveniently set up by bolts $k'$ engaging a flange $e^3$ of the wheel hub. The closing up device may be provided with a felt ring $k^2$ or other suitable packing to exclude dust and dirt and is also preferably provided with openings $k^4$ through which the bearings can be inspected and lubricant introduced as may be necessary, access of dust and dirt through such openings being prevented by a partially revoluble plate $l$ provided with openings $l'$ adapted to register with the openings $k^4$ when the plate is turned to a proper position. The plate $l$ may be held to the closing up device $k$ by bolts $l^2$ which engage slots $l^3$ in the plate.

The guide or carrying plate $c$, as will be understood, is the usual guide plate for the journal boxes and forms, as usual, a part of the truck frame, a further portion of which is indicated at $c'$.

It will be understood that the details of construction and arrangement can be varied to suit different requirements of use and that the invention, therefore, is not limited to the precise construction shown and described herein.

I claim as my invention:

1. In a railway truck, the combination of a truck frame, guides mounted on the truck frame, guide blocks, an axle carried by the guide blocks, means to distribute the load carried by the truck upon the guide blocks, flanged wheels mounted loosely and independently of each other upon said axle and ball bearings between the axle and the wheels, the wheels being chambered to receive the bearings and the guide blocks forming abutments for members of the bearings and closing up devices for the bearing chambers in the wheels.

2. In a railway truck, the combination of a truck frame, guides mounted on the truck frame, guide blocks, an axle carried by the guide blocks, means to distribute the load carried by the truck upon the guide blocks, flanged wheels mounted loosely and independently of each other upon said axle and provided each with an extended hub, a ball bearing between the axle and the hub of the wheel substantially in the plane of the wheel tread, and a secondary ball bearing between the axle and the extended hub.

3. In a railway truck, the combination of a truck frame, guides mounted on the truck frame, guide blocks, an axle carried by the guide blocks, means to distribute the load carried by the truck upon the guide blocks, flanged wheels mounted loosely and independently of each other upon said axle and formed with a bearing chamber, a ball journal bearing located in said chamber substantially in the plane of the wheel tread and a ball thrust bearing also located in said chamber.

4. In a railway truck, the combination of a truck frame, guides mounted on the truck frame, guide blocks, an axle carried by the guide blocks, means to distribute the load carried by the truck upon the guide blocks, flanged wheels mounted loosely and independently of each other upon said axle and having each an extended hub and formed with a bearing chamber, a ball journal bearing located in said chamber substantially in the plane of the wheel tread, a secondary ball journal bearing located in said chamber in the extended hub, and a ball thrust bearing located in said chamber between said journal bearings.

5. In a railway truck, the combination of a truck frame, guides mounted on the truck frame, guide blocks, an axle carried by the guide blocks, means to distribute the load carried by the truck upon the guide blocks, flanged wheels mounted loosely and independently of each other upon said axle, and ball bearings between said axle and wheel and comprising inner and outer race ways and interposed balls, said axle having shoulders forming abutments for the inner members of said bearings, and said guide blocks impinging upon said inner members and holding them against said shoulders.

6. In a railway truck, the combination of a truck frame, guides mounted on the truck frame, guide blocks, an axle carried by the guide blocks, means to distribute the load carried by the truck upon the guide blocks, flanged wheels mounted loosely and independently of each other upon said axle and formed each with a bearing chamber and an internal shoulder or abutment, ball bearings located in said chamber and comprising outer race ways, inner race ways and interposed balls, and closing up members for said bearing chambers holding the outer members of the bearings against said internal shoulders or abutments.

7. In a railway truck, the combination of a truck frame, guides mounted on the truck frame, guide blocks, an axle carried by the guide blocks, means to distribute the load carried by the truck upon the guide blocks, flanged wheels mounted loosely and independently of each other upon said axle and ball bearings between the axle and the wheels, said guide blocks forming closing up devices for the bearing chambers in the wheels and provided with openings to give access therethrough to said bearings.

8. In a railway truck, the combination of a truck frame, guides mounted on the truck frame, guide blocks, an axle carried by the guide blocks, means to distribute the load carried by the truck upon the guide blocks, flanged wheels mounted loosely and independently of each other upon said axle, ball bearings between the axle and the wheels and closing up devices secured to the hubs of the wheels and provided with openings to give access to the bearings therethrough and with movable covers to close said openings.

9. In a railway truck, the combination of a truck frame, guides mounted on the truck frame, guide blocks, an axle carried by the guide blocks and provided with shoulders or abutments, flanged wheels mounted loosely and independently of each other upon said axle and provided with extended hubs and chambered to receive the bearings, said chambers being provided also with internal shoulders or abutments, ball bearings located in said chambers and comprising inner and outer race ways and interposed balls and closing up devices secured to the hubs and holding the outer members of the bearings against the shoulders or abutments of the chambers, said guide blocks forming closing up devices to hold the inner members of the bearings against the shoulders on the axle.

This specification signed and witnessed this 25th day of March, A. D., 1907.

ERNST GUSTAV HOFFMANN.

Signed in the presence of—
W. B. GREELEY,
AMBROSE L. O'SHEA.